US006245425B1

(12) United States Patent
McCullough et al.

(10) Patent No.: US 6,245,425 B1
(45) **Date of Patent: *Jun. 12, 2001**

(54) FIBER REINFORCED ALUMINUM MATRIX COMPOSITE WIRE

(75) Inventors: Colin McCullough, Minneapolis, MN (US); Andreas Mortensen, Cambridge, MA (US); Paul S. Werner, Woodbury; Herve' E. Dève, Minneapolis, both of MN (US); Tracy L. Anderson, Hudson, WI (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 69 days.

(21) Appl. No.: 08/492,960

(22) Filed: Jun. 21, 1995

(51) Int. Cl.[7] .............................. C04B 35/10; B01J 13/00

(52) U.S. Cl. .......................... 428/379; 428/558; 428/570; 428/357; 428/364; 428/375; 428/381; 501/95.2

(58) Field of Search .................................... 428/558, 570, 428/357, 364, 315, 378, 379, 381; 501/95.2

(56) References Cited

U.S. PATENT DOCUMENTS

| | | | |
|---|---|---|---|
| 3,098,723 | 7/1963 | Micks . | |
| 3,547,180 | 12/1970 | Cochran et al. . | |
| 3,808,015 | 4/1974 | Seufert . | |
| 3,813,481 | 5/1974 | Adams . | |
| 4,012,204 | 3/1977 | Riewald et al. . | |
| 4,053,011 | 10/1977 | Riewald et al. | 164/97 |
| 4,450,207 | 5/1984 | Donomoto et al. . | |
| 4,544,610 | 10/1985 | Okamoto et al. . | |
| 4,649,060 | 3/1987 | Ishikawa et al. . | |
| 4,732,799 | 3/1998 | Towata et al. . | |
| 4,757,790 | 7/1988 | Ushio et al. | 123/193 C |
| 4,779,563 | 10/1988 | Ishikawa et al. . | |
| 4,818,633 | 4/1989 | Dinwoodie et al. . | |
| 4,877,643 | 10/1989 | Ishikawa et al. . | |
| 4,929,513 | 5/1990 | Kyono et al. . | |
| 4,954,462 | 9/1990 | Wood et al. . | |
| 4,961,990 | 10/1990 | Yamada et al. . | |
| 5,002,836 | 3/1991 | Dinwoodie et al. . | |
| 5,145,734 | 9/1992 | Ito et al. . | |
| 5,185,299 | 2/1993 | Wood et al. . | |

FOREIGN PATENT DOCUMENTS

| | | |
|---|---|---|
| 3-101011 | 4/1991 | (JP) . |
| 4308609 | 10/1992 | (JP) . |
| 4308610 | 10/1992 | (JP) . |
| 4308611 | 10/1992 | (JP) . |
| 6158197 | 6/1997 | (JP) . |

OTHER PUBLICATIONS

Patent Abstracts of Japan for JP Publication No. 7–105761, Publication Date Apr. 21, 1995.

"State of the Art Materials, Technologies of Today and Tomorrow" by Mikio Morita, Kogyo Zairyo Industrial Materials, vol. 37, No. 17, Dec. 1989, pp. 67–71 and English translation thereof.

"Almax, High Purity Alpha–Alumina Long Fibers", Mitsui Mining Company, Ltd. Product Brochure, and English translation thereof, publication date unknown, but believed to be prior to Jun. 21, 1994.

Almax Fiber Information Letter, Mitsui Mining Company, Limited, 2 pages, Jul. 1992.

"The Advantage of Purity", Siemko, Aerospace Composites & Materials, vol. 3, No. 5, Sep.–Oct. 1991, 2 pages.

(List continued on next page.)

*Primary Examiner*—Richard Weisserger
(74) *Attorney, Agent, or Firm*—Matthew B. McNutt

(57) ABSTRACT

Wire comprising polycrystalline $\alpha$-$Al_2O_3$ fibers within a matrix of substantially pure elemental aluminum, or an alloy elemental aluminum and up to about 2% copper.

22 Claims, 3 Drawing Sheets

OTHER PUBLICATIONS

α–Alumina Fiber brochure, Mitsui Mining Company Limited, 1 page, Publication date unknown, but believed to be prior to Jun. 21, 1994.

α–Alumina Fiber, Almax brochure, Mitsui Mining Company, Limited, 4 pages, Publication date unknown, but believed to be prior to Jun. 21, 1994.

"Process for the Manufacture of Continuous $B/B_4C/A1$ Ribbons and Their Application As Selective Reinforcements Within Continuous Aluminum Beams", Grange et al., Engineering With Composites; The Third Technology Conference, SAMPE, European Chapter, Conference paper, 1983.

"5. Almax Preferences", Society for the Advancement of Material and Process Engineering; $37^{th}$ International SAMPE Symposium, Mar. 9–12, 1992, pp. I–XI.

"Metal Matrix Compositing By Continuous Casting", Shaver, Composite Materials in Engineering design, Proceedings of the $6^{th}$ St. Louis Symposium, ASM, 1973.

"Low Cost Metal–Matrix Composite Fabrication", Davies et al., Mateirals '71, SAMPE $16^{th}$ National, Apr. 21–23, 1971, Anaheim Convention Center, CA, Symposium and exhibit, vol. 16, 1971, pp. 293–301.

Portion of a Publication regarding Almax Fibers, 4 graphs, entitled (1) "The tensile strength of Alumina fibers at room temperature after heat treatment", (2) "Heat Capacity of Almax", (3) Reactivity against Metals (1200°C–2 hours), and (4) Thermal Conductivity of Almax Cloth(Plain):, source unknown, publication date unknown, but believed to be prior to Jun. 21, 1994.

"Low Loss Hermetic Optical Fibre Continuously Metal Casted Over the Buffer Layer", IEE Conf. Publ. (1988), 292 (Eur. Conf. Opt. Commun., $14^{th}$ 1988, PT1), pp. 441–444.

Technical Paper entitled "MMC Overview—1985", by Society of Manufacturing Engineers, 1986.

Article entitled Advanced Materials to fly high in MASP, by Terence M.F. Ronald, Advanced Materials & Processes May 1989.

Article entitled "Standard Test Method for Tensile Strength and Young's Modulus for High–Modulus Single–Filament Materials[1]", by The American Society for Testing and Materials, 1989.

Product brochure entitled "Fiber", by DuPont.

Article entitled, "Standard Test Method of Tension Testing of Metallic Foil[1]", by The American Society for Testing and Materials, 1993.

Product brochure entitled "Continuous Ceramic Fiber Aluminum Matrix Composites", by 3M.

Article entitled "Structure and Room–Temperature Deformation of Alumina Fiber–Reinforced Aluminum", by Metallurgical Transactions A, vol. 23A, Apr. 1992.

Article entitled "Structure and Plasticity of Aluminum Reinforced with Continuous Alumina Fibers", by Isaacs et al., Massachusetts Institute of Technology, Cambridge, MA, 1991.

Casting Kaiser Aluminum, $1^{st}$ Edition, Kaiser Aluminum & Sales, Inc., Oakland, CA (1956) pp. 59–61.

ASM Handbook®, "Casting" vol. 15, ASM International (1988), pp. 238–241; 275; 281–282; 300–304; 372–373; 381–383; 487–488; 755–757.

"Application of Ultrasonic Infiltration in Metal Matrix Composites" by J. Pan, D.M. Yang, H. Wan and X.F. Yin; *Key Engineering Materials*, vols. 104–107 (1995); pp. 275–282; Trans Tech Publications.

"A Study of Ultrasonic Technique Applied in Fabrication of SiC Fiber–Reinforced Aluminum Composites" by J. Pan, D.M. Yang, and X.F. Yin; *J. Mater. Res.*, vol. 10, No. 3, Mar. 1995; pp. 601.

Publication entitled "Mechanical Characteristics of SiC Fiber Reinforced Compoite Wire", 1996 The Electricity Society National Symposium.

Publication entitled "Development and Evaluation Characteristics of SiC Fiber Reinforced Aluminum Composite Wires for Transmission Line", 1995 The Electricity Society Electronics and Energy Department Symposium.

Publication entitled "Mechanical Characteristics of SiC Fiber Reinforced Aluminum Composite Material", 1995 The Electricity Society National Symposium.

FIBER REINFORCED ALUMINUM MATRIX COMPOSITE WIRE

GOVERNMENT LICENSE RIGHTS

The U.S. Government has a paid-up license in this invention and the right in limited circumstances to require the patent owner to license others on reasonable terms as provided for by the terms of contract No. MDA 972–90-C-0018 awarded by the Defense Advanced Research Projects Agency (DARPA).

FIELD OF THE INVENTION

The present invention pertains to composite materials of ceramic fibers within in an aluminum matrix. Such materials are well-suited for various applications in which high strength, low weight materials are required.

BACKGROUND OF THE INVENTION

Continuous fiber reinforced aluminum matrix composites (CF-AMCs) offer exceptional specific properties when compared to conventional alloys and to particulate metal matrix composites. The longitudinal stiffness of such composite materials is typically three times that of conventional alloys, and the specific strength of such composites is typically twice that of high-strength steel or aluminum alloys. Furthermore, for many applications, CF-AMCs are particularly attractive when compared to graphite-polymer composites due to their more moderate anisotropy in properties, particularly their high strength in directions different that those of the fiber axes. Additionally, CF-AMCs offer substantial improvements in allowable service temperature ranges and do not suffer from environmental problems typically encountered by polymeric matrix composites. Such problems include delamination and degradation in hot and humid environments, particularly when exposed to ultraviolet (UV) radiation.

Despite their numerous advantages, known CF-AMCs suffer drawbacks which have hampered their use in many engineering applications. CF-AMCs generally feature high modulus or high strength, but seldom combine both properties. This feature is taught in Table V of R. B. Bhagat, "Casting Fiber-Reinforced Metal Matrix Composites", in Metal Matrix Composites: Processing and Interfaces, R. K. Everett and R. J. Arsenault Eds., Academic Press, 1991, pp. 43–82. In that reference, properties listed for cast CF-AMC only combine a strength in excess of 1 GPa with a modulus in excess of 160 GPa in high-strength carbon-reinforced aluminum, a composite which suffers from low transverse strength, low compressive strength, and poor corrosion resistance. At the present time, the most satisfactory approach for producing CF-AMCs in which high strength in all directions is combined with a high modulus in all directions is with fibers produced by chemical vapor deposition. The resulting fibers, typically boron, are very expensive, too large to be wound into preforms having a small-radius of curvature, and chemically reactive in molten aluminum. Each of these factors significantly reduces the processability and commercial desirability of the fiber.

Furthermore, composites such as aluminum oxide (alumina) fibers in aluminum alloy matrices suffer from additional drawbacks during their manufacture. In particular, during the production of such composite materials, it has been found to be difficult to cause the matrix material to completely infiltrate fiber bundles. Also, many composite metal materials known in the art suffer from insufficient long-term stability as a result of chemical interactions which can take place between the fibers and the surrounding matrix, resulting in fiber degradation over time. In still other instances, it has been found to be difficult to cause the matrix metal to completely wet the fibers. Although attempts have been made to overcome these problems (notably, providing the fibers with chemical coatings to increase wetability and limit chemical degradation, and using pressure differentials to assist matrix infiltration) such attempts have met with only limited success. For example, the resulting matrices have, in some instances, been shown to have decreased physical characteristics. Furthermore, fiber coating methods typically require the addition of several complicated process steps during the manufacturing process.

In view of the above, a need exists for ceramic fiber metal composite materials that offer improved strength and weight characteristics, are free of long term degradation, and which may be produced using a minimum of process steps.

SUMMARY OF THE INVENTION

The present invention relates to continuous fiber aluminum matrix composites having wide industrial applicability. Embodiment of the present invention pertain to continuous fiber aluminum matrix composites having continuous high-strength, high-stiffness fibers contained within a matrix material wherein there are substantially no phases at a fiber/matrix interface that enhance the brittleness of the composite (i.e., the composite is substantially free of brittle intermetallic compounds or phases, or segregated domains of contaminant material at the matrix/fiber interface that enhance the brittleness of the composite). The matrix material is selected to have a relatively low yield strength whereas the fibers are selected to have a relatively high tensile strength. Furthermore, the materials are selected such that the fibers are relatively chemically inert both in the molten and solid phases of the matrix.

Certain embodiments of the present invention relate to composite materials having continuous tows of polycrystalline $\alpha$-$Al_2O_3$ fibers having an average tensile strength of about 2.8 GPa contained within a matrix of substantially pure elemental aluminum having a yield strength of not greater than about 20 MPa or an alloy of elemental aluminum containing up to about 2% by weight copper (based on the total weight of the matrix) having a yield strength of not greater than about 90 MPa. Such composite structures offer high strength and low weight, while at the same time avoid the potential for long term degradation. Such composites may also be made without the need for many of the process steps associated with prior art composite materials.

One wire according to the present invention wire comprising a composite material comprising a tow of continuous polycrystalline $\alpha$-$Al_2O_3$ fibers within a matrix, wherein the polycrystalline $\alpha$-$Al_2O_3$ fibers have an average tensile strength of at least about 2.8 GPa wherein the matrix is selected from the group consisting of substantially pure elemental aluminum and an alloy of substantially pure elemental aluminum and up to about 2% by weight copper, based on the total weight of the matrix, wherein the wire has an average tensile strength of greater than 1.17 GPa.

In one embodiment, the continuous fiber aluminum matrix composites of the present invention are formed into wires exhibiting desirable strength-to-weight characteristics and high electrical conductivity. Such wires are well-suited for use as core materials in high voltage power transmission (HVPT) cables, as they provide electrical and physical characteristics which offer improvements over HVPT cables known in the prior art.

One wire according to the present invention comprises a composite material comprising a plurality of continuous polycrystalline α-$Al_2O_3$ fibers within a matrix selected from the group consisting of an aluminum matrix and a matrix of an alloy of aluminum and up to about 2% by weight copper, based on the total weight of the alloy matrix, wherein the matrices contain less than 0.05 percent by weight impurities, based on the total weight of the matrices. Preferably, the composite material has an average tensile strength of greater than 1.17 GPa.

One wire according to the present invention comprises a composite material comprising a tow of continuous polycrystalline α-$Al_2O_3$ fibers within a matrix, wherein the polycrystalline α-$Al_2O_3$ fibers have an average tensile strength of at least about 2.8 GPa wherein the matrix is selected from the group consisting of substantially pure elemental aluminum and an alloy of elemental aluminum and up to about 2% by weight copper, based on the total weight of the matrix, and wherein the wire has an average tensile strength of greater than 1.17 GPa (170 ksi) (or even at least 1.38 GPa (200 ksi), or at least 1.72 GPa (250 ksi)).

Another wire according to the present invention comprises a composite material comprising a tow of continuous polycrystalline α-$Al_2O_3$ fibers within a matrix selected from the group consisting of substantially pure elemental aluminum and an alloy of elemental aluminum and up to about 2% by weight copper, based on the total weight of the matrix, wherein the wire has an average tensile strength of at least 1.17 GPa (170 ksi) (or even at least 1.38 GPa (200 ksi), or at least 1.52 GPa (220 ksi) or at least 1.72 GPa (250 ksi)).

In one aspect, the present invention provides a wire comprising a composite material comprising a plurality (e.g., a tow(s)) of continuous polycrystalline α-$Al_2O_3$ fibers within a matrix, wherein the matrix is an aluminum matrix that is substantially free of material phases or domains capable of enhancing brittleness of both the fibers and the matrix.

In another aspect, the present invention provides a wire comprising a composite material comprising a plurality (e.g., a tow(s)) of continuous polycrystalline α-$Al_2O_3$ fibers within matrix selected from the group consisting of a substantially pure elemental aluminum matrix and an alloy of substantially pure elemental aluminum and up to about 2% by weight copper.

In yet another aspect, the present invention provides a method of making a continuous composite wire, the method comprising the steps of:

(a) melting a metallic matrix material selected from the group consisting of substantially pure elemental aluminum and an alloy of substantially pure elemental aluminum with up to 2% by weight copper to provide a contained volume of melted metallic matrix material;

(b) imparting ultrasonic energy to cause vibration of the contained volume of melted metallic matrix material of step (a);

(c) immersing a plurality (e.g., a tow(s)) of continuous polycrystalline α-$Al_2O_3$ fibers into the contained volume of melted metallic matrix material while maintaining the vibration to permit the melted metallic matrix material to infiltrate into and coat the plurality of fibers such that an infiltrated, coated plurality of fibers is provided; and (d) withdrawing the infiltrated, coated plurality of fibers from the contained volume of melted metallic matrix material under conditions which permit the melted metallic matrix material to solidify to provide a wire comprising a composite material comprising the plurality of continuous polycrystalline α-$Al_2O_3$ fibers within a matrix, wherein the matrix is selected from the group consisting of substantially pure elemental aluminum and an alloy of substantially pure elemental aluminum and up to about 2% by weight copper, based on the total weight of the matrix.

In yet another aspect, the present invention provides a method of making a continuous composite wire, the method comprising the steps of:

(a) melting a metallic matrix material selected from the group consisting of substantially pure elemental aluminum and an alloy of substantially pure elemental aluminum with up to 2% by weight copper to provide a contained volume of melted metallic matrix material;

(b) imparting ultrasonic energy to cause vibration of the contained volume of melted metallic matrix material of step (a);

(c) immersing a plurality (e.g., a tow(s)) of continuous polycrystalline α-$Al_2O_3$ fibers into the contained volume of melted metallic matrix material while maintaining the vibration to permit the melted metallic matrix material to infiltrate into and coat the plurality of fibers such that an infiltrated, coated plurality of fibers is provided; and (d) withdrawing the infiltrated, coated plurality of fibers from the contained volume of melted metallic matrix material under conditions which permit the melted metallic matrix material to solidify to provide a wire comprising a composite material comprising the plurality of continuous polycrystalline α-$Al_2O_3$ fibers within an aluminum matrix, wherein the matrix is substantially free of material phases or domains capable of enhancing brittleness of both the fibers and the matrix.

DETAILED DESCRIPTION

Figure 1:
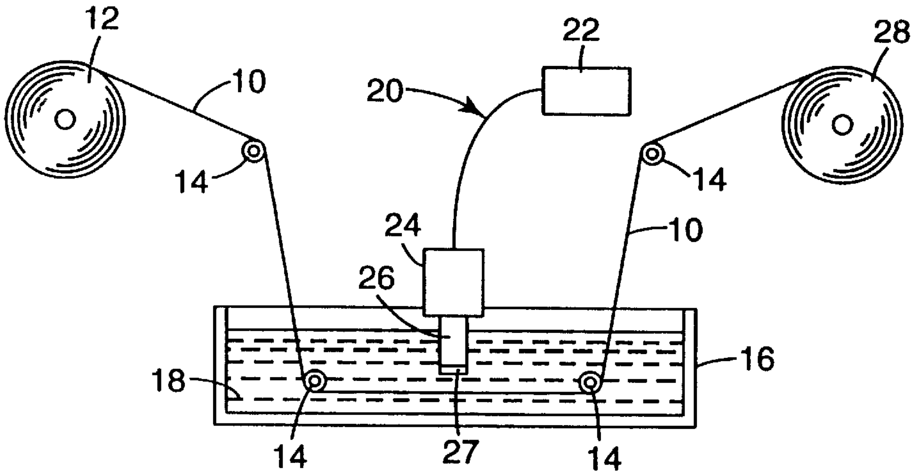
FIG. 1 is a schematic representation of an apparatus for producing composite metal matrix wires using ultrasonic energy.

The fiber reinforced aluminum matrix composites of the present invention comprise continuous fibers of polycrystalline α-$Al_2O_3$ encapsulated within either a matrix of substantially pure elemental aluminum or an alloy of pure aluminum with up to about 2% by weight copper, based on the total weight of the matrix. The preferred fibers comprise equiaxed grains of less than about 100 nm in size, and a fiber diameter in the range of about 1–50 micrometers. A fiber diameter in the range of about 5–25 micrometers is preferred with a range of about 5–15 micrometers being most preferred. Preferred composite materials according to the present invention have a fiber density of between about 3.90–3.95 grams per cubic centimeter. Among the preferred fibers are those described in U.S. Pat. No. 4,954,462 (Wood et al., assigned to Minnesota Mining and Manufacturing Company, St. Paul, Minn.), the teachings of which are hereby incorporated by reference. Such fibers are available commercially under the designation NEXTEL™ 610 ceramic fibers from the Minnesota Mining and Manufacturing Company, St. Paul, Minn. The encapsulating matrix is selected to be such that it does not significantly react chemically with the fiber material (i.e., is relatively chemically inert with respect the fiber material), thereby eliminating the need to provide a protective coating on the fiber exterior.

As used herein, the term "polycrystalline" means a material having predominantly a plurality of crystalline grains in which the grain size is less than the diameter of the fiber in which the grains are present. The term "continuous" is intended to mean a fiber having a length which is relatively infinite when compared to the fiber diameter. In practical terms, such fibers have a length on the order of about 15 cm to at least several meters, and may even have lengths on the order of kilometers or more.

In the preferred embodiments, the use of a matrix comprising either substantially pure elemental aluminum, or an alloy of elemental aluminum with up to about 2% by weight copper, based on the total weight of the matrix, has been shown to produce successful composites. As used herein the terms "substantially pure elemental aluminum", "pure aluminum" and "elemental aluminum" are interchangeable and are intended to mean aluminum containing less than about 0.05% by weight impurities. Such impurities typically comprise first row transition metals (titanium, vanadium, chromium, manganese, iron, cobalt, nickel, and zinc) as well as second and third row metals and elements in the lanthanide series. In one preferred embodiment, the terms are intended to mean aluminum having less than about 0.03% by weight iron, with less than about 0.01% by weight iron being most preferred. Minimizing the iron content is desirable because iron is a common contaminant of aluminum, and further, because iron and aluminum combine to form brittle intermetallic compounds (e.g., $Al_3Fe$, $Al_2Fe$, etc.). It is also particularly desirable to avoid contamination by silicon (such as from $SiO_2$, which can be reduced to free silicon in the presence of molten aluminum) because silicon, like iron, forms a brittle phase, and because silicon can react with the aluminum (and any iron which may be present) to form brittle Al—Fe—Si intermetallic compounds. The presence of brittle phases in the composite is undesirable, as such phases tend to promote fracture in the composite when subjected to stress. In particular, such brittle phases may cause the matrix to fracture even before the reinforcing ceramic fibers fracture, resulting in composite failure. Generally, it is desirable to avoid substantial amounts of any transition metal, (i.e., Groups IB through VIIIB of the periodic table), that form brittle intermetallic compounds. Iron and silicon have been particularly specified herein as a result of their commonality as impurities in metallurgical processes.

Each of the first row transition metals described above is relatively soluble in molten aluminum and, as noted, can react with the aluminum to form brittle intermetallic compounds. In contrast, metal impurities such as tin, lead, bismuth, antimony and the like do not form compounds with aluminum, and are virtually insoluble in molten aluminum. As a result, those impurities tend to segregate to the fiber/matrix interface, thereby weakening the composite strength at the interface. Although such segregation may aid longitudinal strength of the ultimate composite by contributing to a global load sharing domain (discussed below), the presence of the impurities ultimately results in a substantial reduction in the transverse strength of the composite due to decohesion at the fiber/matrix interface. Elements from Groups IA and IIA of the periodic table tend to react with the fiber and drastically decrease the strength of the fiber in the composite. Magnesium and lithium are particularly undesirable elements in this regard, due, in part, to the length of time the fibers and the metal must be maintained at high temperatures during processing or in use.

It should be understood that references to "substantially pure elemental aluminum", "pure aluminum", and "elemental aluminum" as used herein, are intended to apply to the matrix material rather than to the reinforcing fibers, since the fibers will likely include domains of iron (and possibly other) compounds within their grain structure. Such domains typically are remnants of the fiber manufacturing process and have, at most, negligible effect on the overall characteristics of the resulting composite material, since they tend to be relatively small and fully encapsulated within the grains of the fiber. As such, they do not significantly interact with the composite matrix, and thereby avoid the drawbacks associated with matrix contamination.

The metal matrix used in the composite of the present invention is selected to have a low yield strength relative to the reinforcing fibers. In this context, yield strength is defined as the stress at 0.2% offset strain in a standardized tensile test (described in ASTM tensile standard E345-93) of the unreinforced metal or alloy. Generally, two classes of aluminum matrix composites can be broadly distinguished based on the matrix yield strength. Composites in which the matrix has a relatively low yield strength have a high longitudinal tensile strength governed primarily by the strength of the reinforcing fibers. As used herein, low yield strength aluminum matrices in aluminum matrix composites are defined as matrices with a yield strength of less than about 150 MPa. The matrix yield strength is preferably measured on a sample of matrix material having the same composition and which has been fabricated in the same manner as the material used to form the composite matrix. Thus, for example, the yield strength of a substantially pure elemental aluminum matrix material used in a composite material would be determined by testing the yield strength of substantially pure elemental aluminum without a fiber reinforcement. In composites with low yield-strength matrices, matrix shearing in the vicinity of the matrix-fiber interface reduces the stress concentrations near broken fibers and allows for global stress redistribution. In this regime, the composite reaches "rule-of-mixtures" strength. Pure aluminum has a yield strength of less than about 13.8 MPa (2 ksi) and Al-2 wt % Cu has a yield strength less than about 96.5 MPa (14 ksi).

The low yield-strength matrix composites described above may be contrasted with high yield strength matrices which typically exhibit lower composite longitudinal strength than the predicted "rule-of-mixtures" strength. In composites having high strength matrices, the characteristic failure mode is a catastrophic crack propagation. In composite materials, high yield strength matrices typically resist shearing from broken fibers, thereby producing a high stress concentration near any fiber breaks. The high stress concentration allows cracks to propagate, leading to failure of the nearest fiber and catastrophic failure of the composite well before the "rule-of-mixtures" strength is reached. Failure modes in this regime are said to result from "local load sharing". For a metal matrix composite with about 50 volume percent fiber, a low yield strength matrix produces a strong (i.e., >1.17 GPa (170 ksi)) composite when combined with alumina fibers having strengths of greater than 2.8 GPa (400 ksi). Thus, it is believed that for the same fiber loading, the composite strength will increase with fiber strength.

The strength of the composite may be further improved by infiltrating the polycrystalline $\alpha$-$Al_2O_3$ fiber tows with small particles or whiskers, or short (chopped) fibers, of alumina. Such particles, whiskers, or fibers, of alumina. Such domains, typically on the order of less than 20 micrometers, and often submicron, become physically trapped at the fiber surface and provide for spacing between individual fibers within the composite. The spacing eliminates interfiber contact and thereby yields a stronger composite. A discussion of the use of small domains of material to minimize interfiber contact can be found in U.S. Pat. No. 4,961,990 (Yamada et al., assigned to Kabushiki Kaisha Toyota Chuo Kenkyusho and Ube Industries, Ltd., both of Japan).

As noted above, one of the significant obstacles in forming composite materials relates to the difficulty in sufficiently wetting reinforcing fibers with the surrounding matrix material. Likewise, infiltration of the fiber tows with the matrix material is also a significant problem in the production of composite metal matrix wires, since the continuous wire forming process typically takes place at or near atmospheric pressure. This problem also exists for composite materials formed in batch processes at or near atmospheric pressure.

The problem of incomplete matrix infiltration of the fiber tow can be overcome through the use of a source of ultrasonic energy as a matrix infiltration aid. For example, U.S. Pat. No. 4,779,563 (Ishikawa et al., assigned to Agency of Industrial Science and Technology, Tokyo, Japan), describes the use of ultrasonic wave vibration apparatus for use in the production of preform wires, sheets, or tapes from silicon carbide fiber reinforced metal composites. The ultrasonic wave energy is provided to the fibers via a vibrator having a transducer and an ultrasonic "horn" immersed in the molten matrix material in the vicinity of the fibers. The horn is preferably fabricated of a material having little, if any, solubility in the molten matrix to thereby prevent the introduction of contaminants into the matrix. In the present case, horns of commercially pure niobium, or alloys of 95% niobium and 5% molybdenum have been found to yield satisfactory results. The transducer used therewith typically comprises titanium.

One embodiment of a metal matrix fabrication system employing an ultrasonic horn is presented in FIG. 1. In that Figure, a tow of polycrystalline $\alpha$-$Al_2O_3$ fiber 10 is unwound from a supply roll 12 and drawn, by rollers 14, through a vessel 16 containing the matrix metal 18 in molten form. While immersed in the molten matrix metal 18, the tow 10 is subjected to ultrasonic energy provided by an ultrasonic energy source 20 which is immersed in the molten matrix metal 18 in the vicinity of a section of the tow 10. The ultrasonic energy source 20 comprises an oscillator 22 and a vibrator 24 having a transducer 26 and a horn 27. The horn 27 vibrates the molten matrix metal 18 at a frequency produced by the oscillator 22 and transmitted to the vibrator 24 and transducer 26. In so doing, the matrix material is caused to thoroughly infiltrate the fiber tow. The infiltrated tow is drawn from the molten matrix and stored on a take-up roll 28.

The process of making a metal matrix composite often involves forming fibers into a "preform". Typically, fibers are wound into arrays and stacked. Fine diameter alumina fibers are wound so that fibers in a tow stay parallel to one another. The stacking is done in any fashion to obtain a desired fiber density in the final composite. Fibers can be made into simple preforms by winding around a rectangular drum, a wheel or a hoop. Alternatively, they can be wrapped onto a cylinder. The multiple layers of fibers wound or wrapped in this fashion are cut off and stacked or bundled together to form a desired shape. Handling the fiber arrays is aided by using water either straight or mixed with an organic binder to hold the fibers together in a mat.

One method of making a composite part is to position the fibers in a mold, fill the mold with molten metal, and then subject the filled mold to elevated pressure. Such a process is disclosed in U.S. Pat. No. 3,547,180 entitled "Production of Reinforced Composites". The mold should not be a source of contamination to the matrix metal. In one embodiment, the molds can be formed of graphite, alumina, or alumina-coated steel. The fibers can be stacked in the mold in a desired configuration; e.g., parallel to the walls of the mold, or in layers arrayed perpendicular to one another, as is known in the art. The shape of the composite material can be any shape into which a mold can be made. As such, fiber structures can be fabricated using numerous preforms, including, but not limited to, rectangular drums, wheel or hoop shapes, cylindrical shapes, or various molded shapes resulting from stacking or otherwise loading fibers in a mold cavity. Each of the preforms described above relates to a batch process for making a composite device. Continuous processes for the formation of substantially continuous wires, tapes, cables and the like may be employed as well. Typically, only minor machining of the surface of a finished part is necessary. It is possible also to machine any shape from a block of the composite material by using diamond tooling. Thus, it becomes possible to produce many complex shapes.

A wire shape can be formed by infiltrating bundles or tows of alumina fiber with molten aluminum. This can be done by feeding tows of fibers into a bath of molten aluminum. To obtain wetting of the fibers, an ultrasonic horn is used to agitate the bath while the fibers pass through it.

Fiber reinforced metal matrix composites are important for applications wherein lightweight, strong, high-temperature-resistant (at least about 300° C.) materials are needed. For example, the composites can be used for gas turbine compressor blades in jet engines, structural tubes, actuator rods, I-beams, automotive connecting rods, missile fins, fly wheel rotors, sports equipment (e.g., golf clubs) and power transmission cable support cores. Metal matrix composites are superior to unreinforced metals in stiffness, strength, fatigue resistance, and wear characteristics.

In one preferred embodiment of the present invention, the composite material comprises between about 30–70% therefor—by volume polycrystalline $\alpha$-$Al_2O_3$ fibers, based on the total volume of the composite material within a substantially elemental aluminum matrix. It is preferred that the matrix contains less than about 0.03% by weight iron, and most preferably less than about 0.01% by weight iron, based on the total weight of the matrix. A fiber content of between about 40–60% by volume polycrystalline $\alpha$-$Al_2O_3$ fibers is preferred. Such composites, formed with a matrix having a yield strength of less than about 20 MPa and fibers having a longitudinal tensile strength of at least about 2.8 GPa have been found to have excellent strength characteristics.

The matrix may also be formed from an alloy of elemental aluminum with up to about 2% by weight copper, based on the total weight of the matrix. As in the embodiment in which a substantially pure elemental aluminum matrix is used, composites having an aluminum/copper alloy matrix preferably comprise between about 30–70% by volume polycrystalline α-$Al_2O_3$ fibers, and more preferably 40–60% by volume polycrystalline α-$Al_2O_3$ fibers, based on the total volume of the composite. In addition, the matrix preferably contains less than about 0.03% by weight iron, and most preferably less than about 0.01% by weight iron, based on the total weight of the matrix. The aluminum/copper matrix preferably has a yield strength of less than about 90 MPa, and, as above, the polycrystalline α-$Al_2O_3$ fibers have a longitudinal tensile strength of at least about 2.8 GPa. The properties of two composites, a first with an elemental aluminum matrix, and a second with a matrix of the specified aluminum/copper alloy, each having between about 55–65 vol. % polycrystalline α-$Al_2O_3$ fibers are presented in Table I below:

TABLE I

SUMMARY OF COMPOSITE PROPERTIES (1)

| | Pure Al 55–65 vol % $Al_2O_3$ | Al-2 wt % Cu 55–65 vol % $Al_2O_3$ |
|---|---|---|
| Longitudinal | 220–260 GPa | 220–260 GPa |
| Young's Modulus, $E_{11}$(2) | (32–38 Msi) | (32–38 Msi) |
| Transverse | 120–140 GPa | 150–160 GPa |
| Young's Modulus, $E_{22}$ | (17.5–20 Msi) | (22–23 Msi) |
| Shear Modulus, $G_{12}$ | 48–50 GPa | 45–47 GPa |
| | (6.5–7.3 Msi) | (6.5–6.8 Msi) |
| Shear Modulus, $G_{21}$ | 54–57 GPa | 55–56 GPa |
| | (7.8–8.3 Msi) | (8–8.2 Msi) |
| Long. tensile strength | 1500–1900 MPa | 1500–1800 MPa |
| $S_{11,T}$ | (220–275 ksi) | (220–260 ksi) |
| Long. compressive | 1700–1800 MPa | 3500–3700 MPa |
| strength, $S_{11,c}$ | (245–260 ksi) | (500–540 ksi) |
| Shear Strength | 70 MPa | 140 MPa |
| $S_{21}$–$S_{12}$ | (10 ksi) | (20 ksi) |
| at 2% strain | | |
| Trans. strength $S_{22}$ | 110–130 MPa | 270–320 MPa |
| at 1% strain | (16–19 ksi) | (39–46 ksi) |

(1) The properties listed in this table represent a range of mechanical performance measured on composites containing 55–65 vol % NEXTEL ™ 610 ceramic fibers. The range is not representative of the statistical scatter.
(2) Index Notation
1 = Fiber direction; 2 = Transverse direction; ij:i direction normal to the plane in which the stress is acting, j = stress direction, S = Ultimate strength unless specified.

Although suitable for a wide variety of uses, in one embodiment, the composites of the present invention have applicability in the formation of composite matrix wire. Such wires are formed from substantially continuous polycrystalline α-$Al_2O_3$ fibers contained within the substantially pure elemental aluminum matrix or the matrix formed from the alloy of elemental aluminum and up to about 2% by weight copper described above. Such wires are made by a process in which a spool of substantially continuous polycrystalline α-$Al_2O_3$ fibers, arranged in a fiber tow, is pulled through a bath of molten matrix material. The resulting segment is then solidified, thereby providing fibers encapsulated within the matrix. It is preferred that an ultrasonic horn, as described above, is lowered into the molten matrix bath and used to aid the infiltration of the matrix into the fiber tows.

Composite metal matrix wires, such as those described above, are useful in numerous applications. Such wires are believed to be particularly desirable for use in overhead high voltage power transmission cables due to their combination of low weight, high strength, good electrical conductivity, low coefficient of thermal expansion, high use temperatures, and resistance to corrosion. The competitiveness of composite metal matrix wires, such as those described above for use in overhead high voltage power transmission, is a result of the significant effect cable performance has on the entire electricity transport system. Cable having lower weight per unit strength, coupled with increased conductivity and lower thermal expansion, provides the ability to install greater cable spans and/or lower tower heights. As a result, the costs of constructing electrical towers for a given electricity transport system can be significantly reduced. Additionally, improvements in the electrical properties of a conductor can reduce electrical losses in the transmission system, thereby reducing the need for additional power generation to compensate for such losses.

Figure 2A:
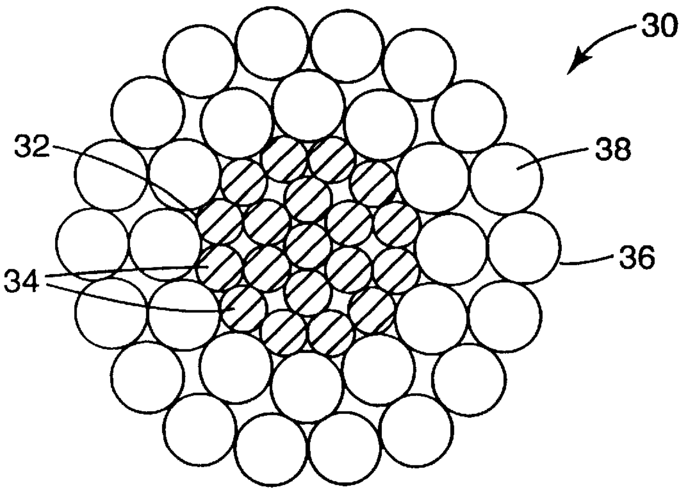
FIGS. 2*a* and 2*b* are schematic, cross-sections of two embodiments of overhead high voltage transmission cables having composite metal matrix cores.
Figure 2B:
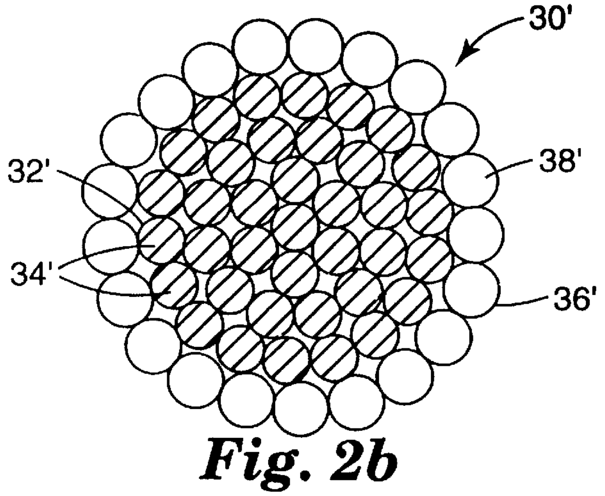

As noted above, the composite metal matrix wires of the present invention are believed to be particularly well-suited for use in overhead high voltage power transmission cables. In one embodiment, an overhead high voltage power transmission cable can include an electrically conductive core formed by at least one composite metal matrix wire according to the present invention. The core is surrounded by at least one conductive jacket formed by a plurality of aluminum or aluminum alloy wires. Numerous cable core and jacket configurations are known in the cable art. For example, as shown in FIG. 2*a*, the cross-section of one overhead high voltage power transmission cable 30 may be a core 32 of nineteen individual composite metal matrix wires 34 surrounded by a jacket 36 of thirty individual aluminum or aluminum alloy wires 38. Likewise, as shown in FIG. 2*b*, as one of many alternatives, the cross section of a different overhead high voltage power transmission cable 30' may be a core 32' of thirty-seven individual composite metal matrix wires 34' surrounded by a jacket 36' of twenty-one individual aluminum or aluminum alloy wires 38'.

The weight percentage of composite metal matrix wires within the cable will depend upon the design of the transmission line. In that cable, the aluminum or aluminum alloy wires used in the conductive jackets are any of the various materials known in the art of overhead high voltage power transmission, including, but not limited to, 1350 Al or 6201 Al.

In another embodiment, an overhead high voltage power transmission cable can be constructed entirely of a plurality of continuous fiber aluminum matrix composite wires (CF-AMCs). As is discussed below, such a construction is well-suited for long cable spans in which the strength-to-weight ratio and the coefficient of thermal expansion of the cable overrides the need to minimize resistive losses.

Figure 3:
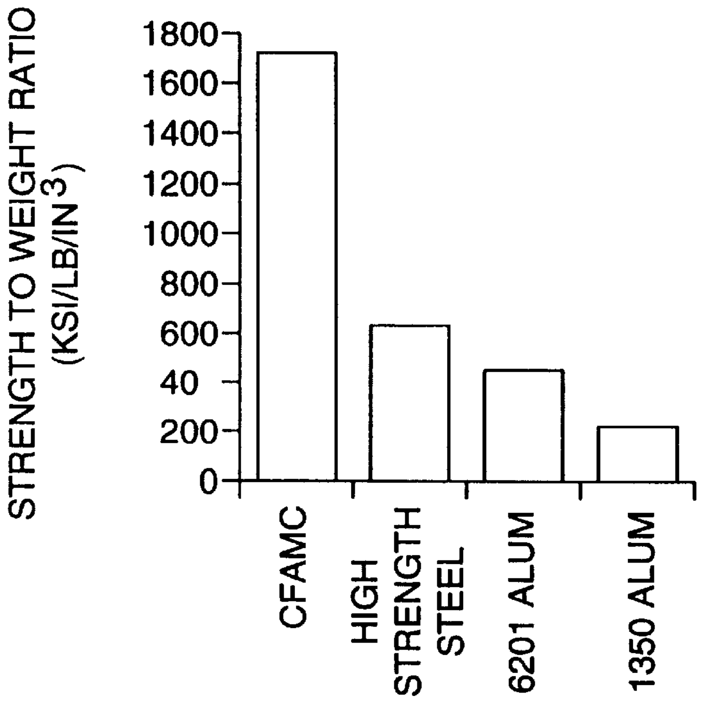
FIG. 3 is a chart comparing strength-to-weight ratios for materials of the present invention with other materials.

Although dependent upon a number of factors, the amount of sag in an overhead high voltage power transmission cable varies as the square of the span length and inversely with the tensile strength of the cable. As may be seen in FIG. 3, CF-AMC materials offer substantial improvements in the strength-to-weight ratio over materials commonly used for cable in the power transmission industry. It should be noted that the strength, electrical conductivity and density of CF-AMC materials and cables is dependent upon the fiber volume in the composite. For FIGS. 3, 4*a*, 4*b*, and 5 a 50% fiber volume was assumed, with a corresponding density of about 3.2 gm/$cm^3$ (approximately 0.115 lb/$in^3$), tensile strength of 1.38 GPa (200 ksi), and conductivity of 30% IACS.

Figure 4A:
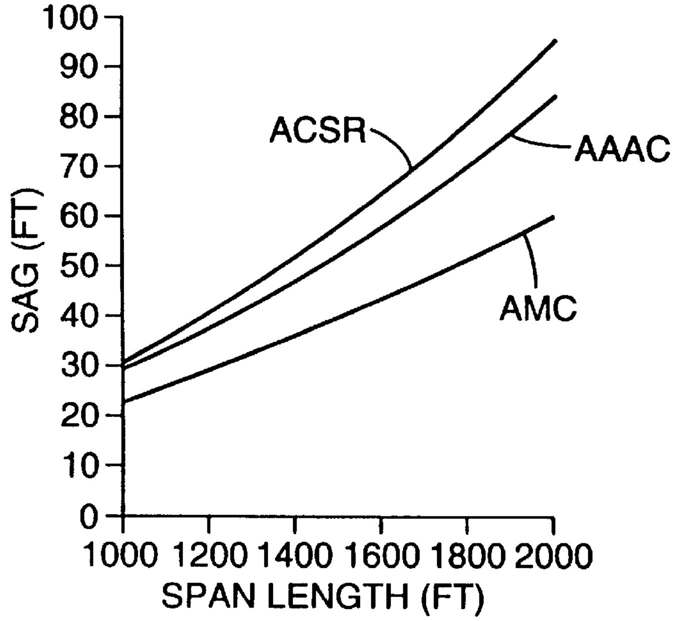
FIGS. 4*a* and 4*b* are graphs comparing projected sag as a function of span length for various cables.
Figure 4B:
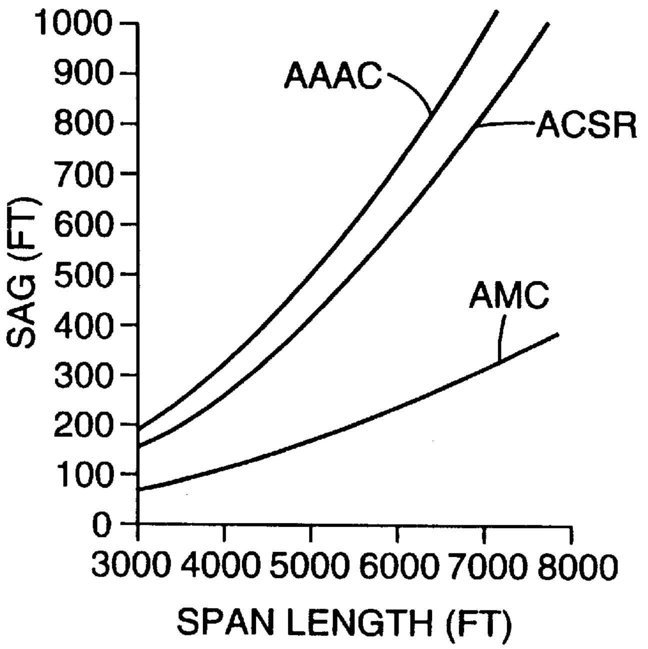

As a result of the increased strength of cables containing CF-AMC wires, cable sag can be substantially reduced. Calculations comparing the sags of CF-AMC cables as a function of span length with a commonly used steel stranding (ACSR) (31 wt % steel having a core of 7 steel wires surrounded by a jacket of 26 aluminum wires), and an equivalent all-aluminum alloy conductor (AAAC) are shown in FIGS. 4*a* and 4*b*. All cables had equivalent electrical conductivity and diameter. FIG. 4*a* demonstrates that CF-AMC cables provide for a 40% reduction in tower height as compared to ACSR for spans of about 550 m (about 1800 ft). Likewise, CF-AMC cables allow for an increase in span length about 25% assuming allowable sags of 15 m (about 50 ft). Further advantages from the use of CF-AMC cables in long spans are presented in FIG. 4*b*. In FIG. 4*b*, the ACSR cable was 72 wt % steel having a core of 19 steel wires surrounded by a jacket of 16 aluminum wires).

Figure 5:
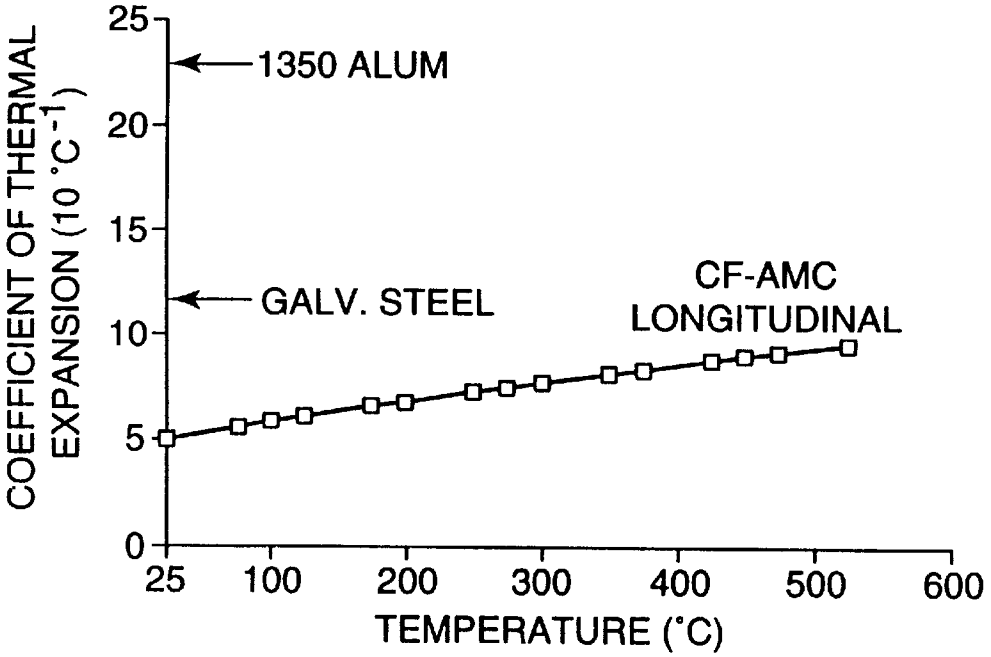
FIG. 5 is a graph showing the coefficient of thermal expansion as a function of temperature for a CF-AMC wire.

The sag of a high voltage power transmission (HVPT) cable at its maximum operating temperature is also dependent upon the coefficient of thermal expansion (CTE) of the cable at its maximum operating temperature. The ultimate CTE of the cable is determined by the CTE and the elastic modulus of both the reinforcing core and the surrounding strands. Within limits, materials with a low CTE and a high elastic modulus are desired. The CTE for the CF-AMC cable is shown in FIG. 5 as a function of temperature. Reference values for aluminum and steel are provided as well.

It is noted that the present invention is not intended to be limited to wires and HVPT cables employing composite metal matrix technology; rather, it is intended to include the specific inventive composite materials described herein as well as numerous additional applications. Thus, the composite metal matrix materials described herein may be used in any of a wide variety of applications, including, but not limited to, flywheel rotors, high performance aerospace components, voltage transmission, or many other applications in which high strength, low density materials are desired.

It should be further noted that although the preferred embodiment makes use of the polycrystalline $\alpha$-$Al_2O_3$ fibers described in U.S. Pat. No. 4,954,462 (previously incorporated) currently being marketed under the tradename NEXTEL™ 610 by Minnesota Mining and Manufacturing Company of St. Paul, Minn., the invention is not intended to be limited to those specific fibers. Suitable any polycrystalline $\alpha$-$Al_2O_3$ fiber is intended to be included herein as well. It is preferred, however, that any such fiber have a tensile strength at least on the order of that of the NEXTEL™ 610 fibers (approximately 2.8 GPa).

In the practice of the invention, the matrix must be substantially chemically inert relative to the fiber over a temperature range between about 20° C.–760° C. The temperature range represents the range of predicted processing and service temperatures for the composite. This requirement minimizes chemical reactions between the matrix and fiber which may be deleterious to the overall composite properties. In the case of a matrix material comprising an alloy of elemental aluminum and up to about 2% by weight copper, the as-cast alloy has a yield strength of approximately 41.4–55.2 MPa (6–8 ksi). In order to increase the strength of this metal alloy, various treatment methods may be used. In one preferred embodiment, once combined with the metallic fibers, the alloy is heated to about 520° C. for about 16 hours followed by quenching in water maintained at a temperature of between about 60–100° C. The composite is then placed in an oven and maintained at about 190° C. and maintained at that temperature until the desired strength of the matrix is achieved (typically 0–10 days). The matrix has been found to reach a maximum yield strength of about 68.9–89.6 MPa (10–13 ksi) when it was maintained at a temperature of approximately 190° C. for five days. In contrast, pure aluminum that is not specifically heat treated has a yield strength of approximately 6.9–13.8 MPa (1–2 ksi) in the as-cast state.

Examples

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

Test Methods

Fiber strength was measured using a tensile tester (commercially available as Instron 4201 tester from Instron of Canton, Mass.), and the test is described in ASTM D 3379-75, (Standard Test Methods for Tensile Strength and Young's Modulus for High Modulus Single-Filament Materials). The specimen gauge length was 25.4 mm (1 inch), the strain rate was 0.02 mm/mm/min.

To establish the tensile strength of a fiber tow, ten single fiber filaments were randomly chosen from a tow of fibers. Each filament was tested to determine its breaking load. At least 10 filaments were tested with the average strength of the filaments in the tow being determined. Each individual, randomly selected fiber had strength ranging from 2.06–4.82 GPa (300–700 ksi). The average individual filament tensile strength ranged from 2.76 to 3.58 GPa (400–520 ksi).

Fiber diameter was measured optically using an attachment to an optical microscope (Dolan-Jenner Measure-Rite Video Micrometer System, Model M25-0002, commercially available from Dolan-Jenner Industries, Inc. of Lawrence Mass.) at x1000 magnification. The apparatus used reflected light observation with a calibrated stage micrometer.

The breaking stress of each individual filament was calculated as the load per unit area.

The fiber elongation was determined from the load displacement curve and ranged from about 0.55% to about 1.3%.

The average strength of the polycrystalline $\alpha$-$Al_2O_3$ fibers used in the working examples was greater than 2.76 GPa (400 ksi) (with 15% standard deviation typical). The higher the average strength of the reinforcing fiber, the higher the composite strength. Composites made according to this embodiment of the present invention had a strength of at least 1.38 GPa (200 ksi) (with 5% standard deviation), and often at least 1.72 GPa (250 ksi) (with 5% standard deviation) when provided with a fiber volume fraction of approximately 60% (based on the total volume of the composite).

Tensile Testing

The tensile strength of the composite was measured using a tensile tester (commercially available as an Instron 8562 Tester from Instron Corp. of Canton, Mass.). This test was carried out substantially as described for the tensile testing of metal foils, i.e., as described in ASTM E345–93, (Standard Test Methods for Tension Testing of Metallic Foil).

In order to perform tensile testing, the composite was made into a plate 15.24 cm×7.62 cm×0.13 cm (6"×3"×0.05"). Using a diamond saw, this plate was cut into 7 coupons (15.24 cm×0.95 cm×0.13 cm (6"×0.375"×0.05")) which were used for testing.

Average longitudinal strength (i.e., fiber parallel to test direction) was measured at 1.38 GPa (200 ksi) for composites having a matrix of either pure aluminum or (pure) aluminum with 2% by weight Cu. For composites having a fiber volume content of about 60%, average transverse strength (i.e., fiber perpendicular to the test direction) was 138 MPa (20 ksi) for composites containing pure aluminum and 262 MPa (38 ksi) for composites made with the aluminumn/2% copper alloy.

Specific examples of various composite metal matrix fabrications are described below.

Example 1

Preparation of a fiber-reinforced metal composite

A composite was prepared using a tow of NEXTEL™ 610 alumina ceramic fibers. The tow contained 420 fibers. The fibers were substantially round in cross-section and had diameters ranging from approximately 11–13 micrometers on average. The average tensile strength of the fibers (measured as described above) ranged from 2.76–3.58 GPa (400–520 ksi). Individual fibers had strengths ranging from 2.06–4.82 GPa (300–700 ksi).

The fibers were prepared for infiltration with metal by winding the fibers into a "preform". In particular, the fibers were wet with distilled water and wound around a rectangular drum having a circumference of approximately 86.4 cm (34 inches) in multiple layers to the desired preform thickness of approximately 0.25 cm (0.10 in).

The wound fibers were cut from the drum and stacked in the mold cavity to produce the final desired preform thickness. A graphite mold in the shape of a rectangular plate was used. Approximately 1300 grams of aluminum metal (commercially available as Grade 99.99% from Belmont Metals of Brooklyn, N.Y.) were placed into the casting vessel.

The mold containing the fibers was placed into a pressure infiltration casting apparatus. In this apparatus, the mold was placed into an airtight vessel or crucible and positioned at the bottom of an evacuable chamber. Pieces of aluminum metal were loaded into the chamber on a support plate above the mold. Small holes (approximately 2.54 mm in diameter) were present in the support plate to permit passage of molten aluminum to the mold below. The chamber was closed and the chamber pressure was reduced to 3 milliTorr to evacuate the air from the mold and the chamber. The aluminum metal was heated to 720° C. and the mold (and fibrous preform in it) was heated to at least about 670° C. The aluminum melted at this temperature but remained on the plate above the mold. In order to fill the mold, the power to the heaters was turned off, and the chamber was pressurized by filling with argon to a pressure of 8.96 MPa (1300 psi). The molten aluminum immediately flowed through the holes in the support plate and into the mold. The temperature was allowed to drop to 600° C. before venting the chamber to the atmosphere. After the chamber had cooled to room temperature, the part was removed from the mold. The resulting samples had dimensions of 15.2 cm×7.6 cm×0.13 cm (6"×3"×0.05").

The sample rectangular composite pieces contained 60 volume % fiber. The volume fraction was measured by using the Archimedes principle of fluid displacement and by examining a photomicrograph of a polished cross-section at 200× magnification.

The part was cut into coupons for tensile testing; it was not machined further. The tensile strength, measured from coupons as described above, was 1400 MPa (204 ksi) (longitudinal strength) and 140 MPa (20.4 ksi) (transverse strength).

Example 2

Preparation of Metal Matrix Composite Wires

The fibers and metal used in this example were the same as those described in Example 1. The alumina fiber was not made into a preform. Instead, the fibers (in the form of multiple tows) were fed into a molten bath of aluminum and then onto a take-up spool. The aluminum was melted in an alumina crucible having dimensions of about 24.1 cm×31.3 cm×31.8 cm (9.5"×12.5"×12.5") (commercially available from Vesuvius McDaniel of Beaver Falls, Pa.). The temperature of the molten aluminum was approximately 720° C. An alloy of 95% niobium and 5% molybdenum was fashioned into a cylinder having dimensions of about 12.7 cm (5") long ×2.5 cm (1") diameter. The cylinder was used as an ultrasonic horn actuator by tuning to the desired vibration (i.e., tuned by altering the length), to a vibration frequency of about 20.0–20.4 kHz. The amplitude of the actuator was greater than 0.002 cm (0.0008"). The actuator was connected to a titanium waveguide which, in turn, was connected to the ultrasonic transducer. The fibers were infiltrated with matrix material to form wires of relatively uniform cross-section and diameter. Wires made by this process had diameters of about 0.13 cm (0.05").

The volume percent of fiber was estimated from a photomicrograph of a cross section (at 200× magnification) to be about 40 volume %.

The tensile strength of the wire was 1.03–1.31 GPa (150–190 ksi).

The elongation at room temperature was approximately 0.7–0.8%. Elongation was measured during the tensile test by an extensometer.

Example 3

Composite Metal Matrix Materials Using an Al/Cu Alloy Matrix

This example was carried out exactly as described in Example 1, except that instead of using pure aluminum, an alloy containing aluminum and 2% by weight copper was used. The alloy contained less than about 0.02% by weight iron, and less than about 0.05% by weight total impurities. The yield strength of this alloy ranged from 41.4–103.4 MPa (6–15 ksi). The alloy was heat treated according to the following schedule:

520° C. for 16 hours followed by a water quench (water temperature ranging from 60–100° C.); and immediately placed into an oven at 190° C. and held for 5 days.

The processing proceeded as described for Example 1 to produce rectangular pieces to make coupons suitable for tensile testing except that the metal was heated to 710° C. and the mold (with the fibers in it) was heated to greater than 660° C.

The composite contained 60 volume % of fiber. The longitudinal strength ranged from 1.38–1.86 GPa (200–270 ksi) (with the average of 10 measurements of 1.52 GPa (220 ksi)) and the transverse strength ranged from 239–328 MPa (35–48 ksi) (with an average of 10 measurements of 262 MPa (38 ksi)).

Equivalents

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A wire comprising a composite material comprising a plurality of continuous polycrystalline $\alpha$-$Al_2O_3$ fibers within a matrix selected from the group consisting of an aluminum matrix and a matrix of an alloy of aluminum and up to about 2% by weight copper, based on the total weight of said alloy matrix, wherein said matrices contain less than 0.05 percent by weight impurities, based on the total weight of said matrices.

2. The wire according to claim 1 wherein said plurality of continuous polycrystalline $\alpha$-$Al_2O_3$ fibers includes at least one tow of continuous polycrystalline $\alpha$-$Al_2O_3$ fibers.

3. The wire according to claim 2 wherein said polycrystalline $\alpha$-$Al_2O_3$ fibers have an average tensile strength of at least about 2.8 GPa.

4. The wire according to claim 3 comprising between about 30–70% by volume of said polycrystalline $\alpha$-$Al_2O_3$ fibers, based on the total volume of said composite material.

5. The wire according to claim 3 comprising between about 40–60% by volume of said polycrystalline $\alpha$-$Al_2O_3$ fibers, based on the total volume of said composite material.

6. The wire according to claim 5 wherein said aluminum matrix contains less than about 0.03% by weight iron, based on the total weight of said matrix.

7. The wire according to claim 3 having an average tensile strength of at least 1.38 GPa.

8. The wire according to claim 3 having an average tensile strength of at least 1.52 GPa.

9. The wire according to claim 3 having an average tensile strength of at least 1.72 GPa.

10. The wire according to claim 3 wherein said polycrystalline $\alpha$-$Al_2O_3$ fibers comprise at least 90% by weight alumina, based on the total weight of each respective fiber, wherein at least 99% by weight of the alumina of said fibers is in the alpha phase, wherein said fibers have a uniform grain structure comprising alpha alumina crystallites having an average crystallite diameter less than 0.5 micrometer, wherein at least 95% by weight of said alpha alumina crystallites are less than 0.5 micrometer in diameter and at least 99 percent are less than 0.7 micrometer in diameter, and wherein said fibers have a density of at least 90 percent of theoretical.

11. The wire according to claim 10 wherein said fibers each have an iron equivalence in the range of 0.1 to 7.0 percent by weight, based on the total weight of the fiber.

12. The wire according to claim 3 wherein said continuous polycrystalline $\alpha$-$Al_2O_3$ fibers are free of an exterior protective coating.

13. The wire according to claim 1 wherein said matrix is substantially pure elemental aluminum.

14. The wire according to claim 3 wherein said matrix has a yield strength of less than 20 MPa.

15. The wire according to claim 3 wherein said matrix is an alloy of aluminum and up to about 2% by weight copper, based on the total weight of said matrix.

16. The wire according to claim 15 wherein said matrix has a yield strength of less than 90 MPa.

17. A wire comprising a composite material comprising a plurality of continuous polycrystalline $\alpha$-$Al_2O_3$ fibers within a matrix selected from the group consisting of an aluminum matrix and a matrix of an alloy of aluminum and up to about 2% by weight copper, based on the total weight of said alloy matrix, wherein said matrices contain less than 0.05 percent by weight impurities, based on the total weight of said matrices, wherein said plurality of continuous polycrystalline $\alpha$-$Al_2O_3$ fibers includes tows of continuous polycrystalline $\alpha$-$Al_2O_3$ fibers, wherein said polycrystalline $\alpha$-$Al_2O_3$ fibers have an average tensile strength of at least about 2.8 GPa, wherein said continuous polycrystalline: $\alpha$-$Al_2O_3$ fibers are free of an exterior protective coating, wherein said polycrystalline $\alpha$-$Al_2O_3$ fibers comprise at least 90% by weight alumina, based on the total weight of each respective fiber, wherein at least 99% by weight of the alumina of said fibers is in the alpha phase, wherein said fibers have a uniform grain structure comprising alpha alumina crystallites having an average crystallite diameter less than 0.5 micrometer, wherein at least 95% by weight of said alpha alumina crystallites of said fibers are less than 0.5 micrometer in diameter and at least 99 percent are less than 0.7 micrometer in diameter, wherein said fibers have a density of at least 90 percent of theoretical, and wherein said wire comprises between about 30–70% by volume of said polycrystalline $\alpha$-$Al_2O_3$ fibers, based on the total volume of said composite material.

18. The wire according to claim 3 wherein said composite material has an average tensile strength of greater than 1.17 GPa.

19. The wire according to claim 16 wherein said composite material has an average tensile strength of greater than 1.17 GPa.

20. The wire according to claim 17 wherein said matrix has a yield strength of less than 90 MPa.

21. The wire according to claim 20 wherein said composite material has an average tensile strength of greater than 1.17 GPa.

22. The wire according to claim 17 wherein said composite material has an average tensile strength of greater than 1.17 GPa.

* * * * *

UNITED STATES PATENT AND TRADEMARK OFFICE

CERTIFICATE OF CORRECTION

PATENT NO. : 6,245,425 B1
DATED : June 12, 2001
INVENTOR(S) : McCullough, Colin

It is certified that error appears in the above-identified patent and that said Letters Patent is hereby corrected as shown below:

Title page,
Item [56], OTHER PUBLICATIONS, delete "Mateirals '71," and insert in place thereof -- Materials '71, --; also delete "Trans" and insert in place thereof -- Trams --.

Signed and Sealed this

Eighteenth Day of March, 2003

JAMES E. ROGAN
*Director of the United States Patent and Trademark Office*